Figure 1:
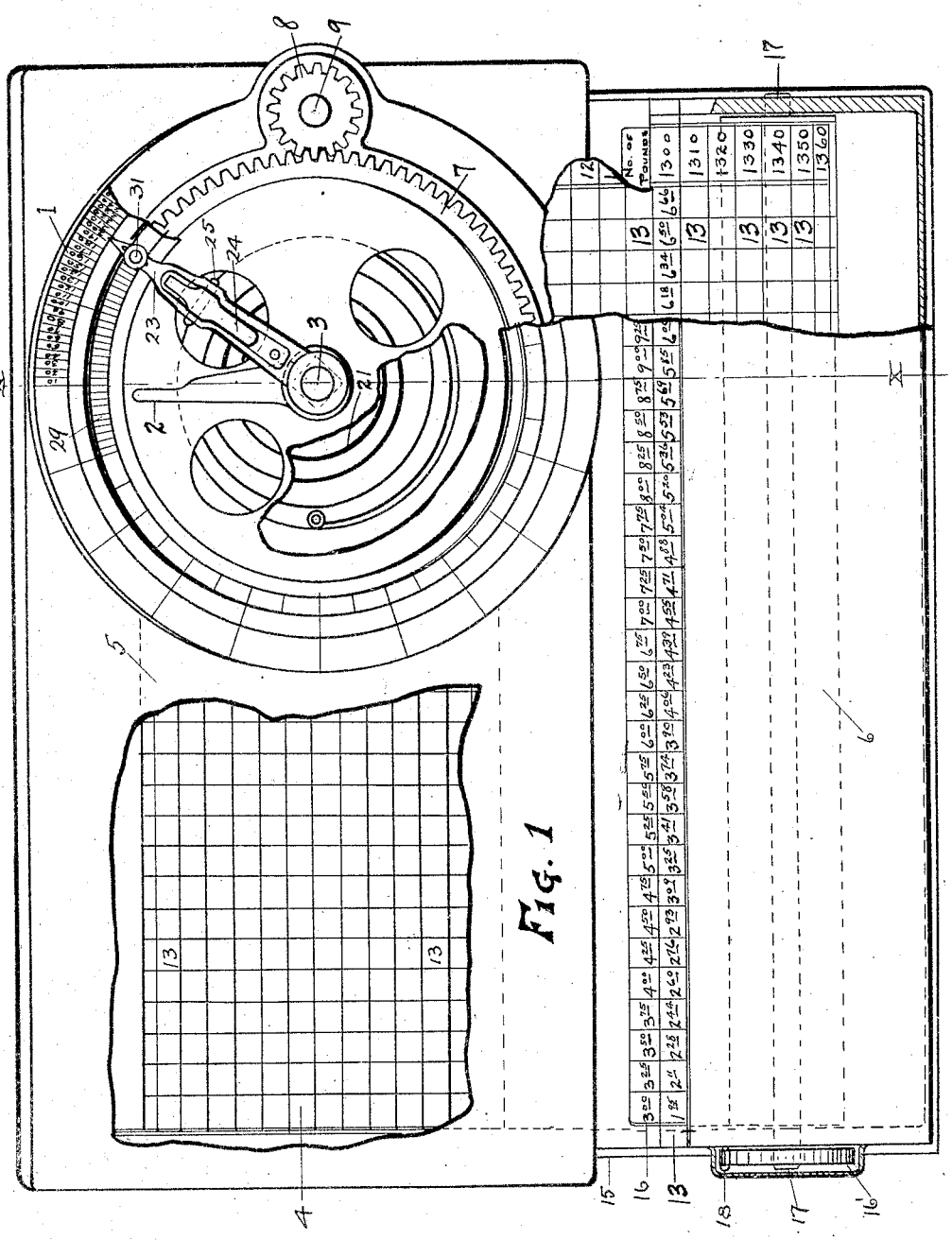

A. Z. SEE.
COMPUTING MACHINE.
APPLICATION FILED MAR. 20, 1909.

948,077.

Patented Feb. 1, 1910.

3 SHEETS—SHEET 1.

WITNESSES
O. R. Erwin
A. J. Bayley

INVENTOR
Albert Z. See
By Emond & Wieder
ATTORNEYS

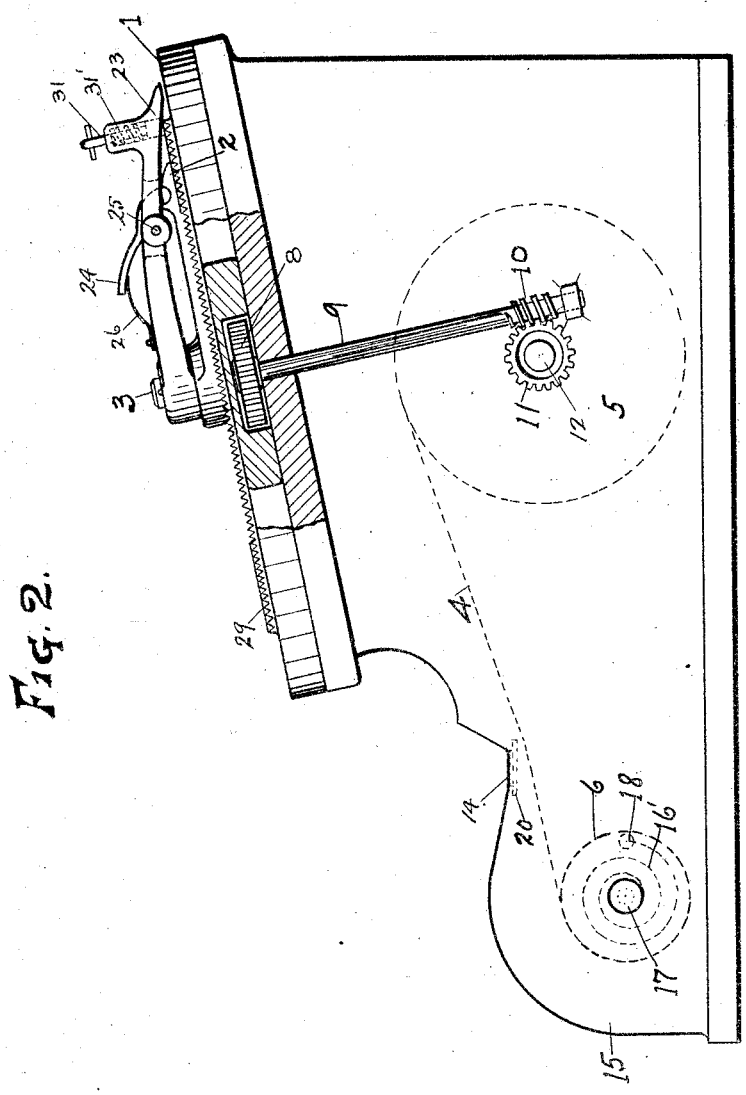

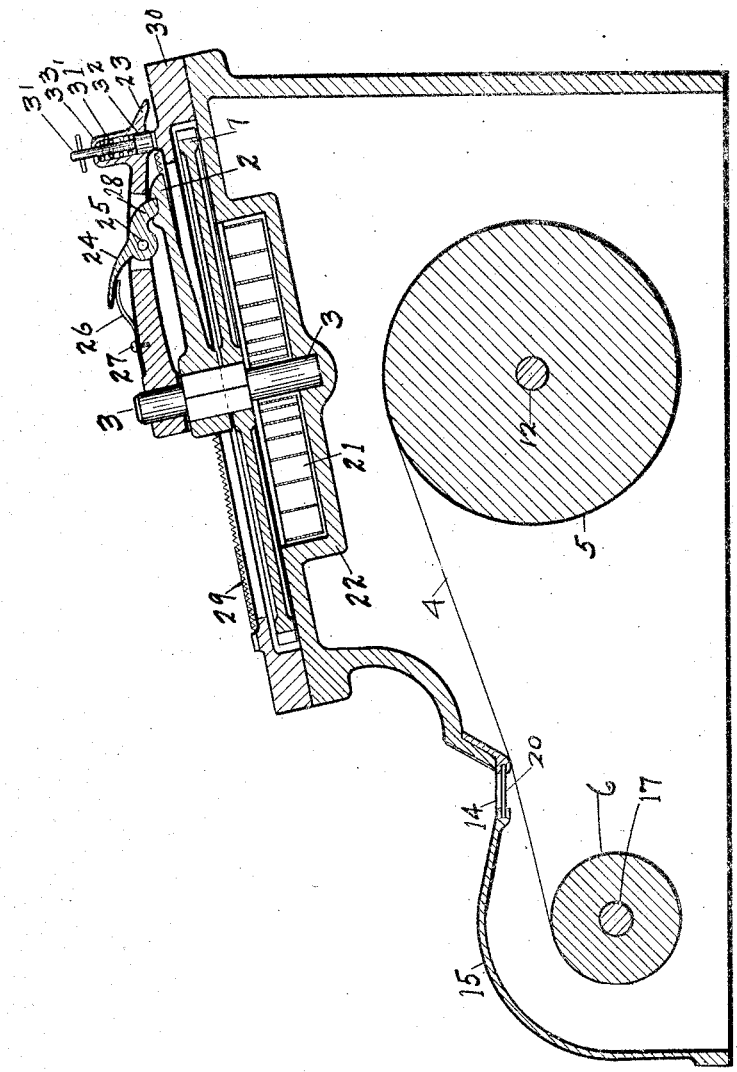

UNITED STATES PATENT OFFICE.

ALBERT Z. SEE, OF MARKESAN, WISCONSIN.

COMPUTING-MACHINE.

948,077. Specification of Letters Patent. Patented Feb. 1, 1910.

Application filed March 20, 1909. Serial No. 484,648.

*To all whom it may concern:*

Be it known that I, ALBERT Z. SEE, a citizen of the United States, residing at Markesan, county of Green Lake, and State of Wisconsin, have invented new and useful Improvements in Computing-Machines, of which the following is a specification.

The object of my invention is to provide a device for computing the price of coal or other goods which are sold by the ton or fraction thereof, and which will give the total cost of the quantity weighed at any given price per ton, whereby when the weight of the load is given, it becomes necessary for the operator to simply move a revolving pointer over a so called weight scale to the numerals which correspond with the weight of the load, whereby a so called cost scale which is connected with said pointer will be brought into view, from which the operator can at once see the value of the load at the agreed price and whereby the necessity of computation is avoided.

While my device may be made to indicate prices of other goods in greater quantities and at other or different prices from those hereinafter named, for brevity of description, the device shown is described as adapted to indicate the price of coal in lots ranging from ten pounds to two tons and at prices ranging from $3.00 to $11.00 per ton.

It will be understood that the coal is first weighed on an ordinary scale, whereby the weight of the load is first obtained. Assuming, for example, the load weighs one ton, the mechanism is so adjusted that the pointer is revolved once entirely around the annular weight scale and stopped. Assuming that the load weighs two tons, two complete revolutions are given to the pointer. In other words, the pointer is moved one complete revolution over the weight scale for every ton computed. If, however, the load weighs a ton and a half, the pointer is given one and a half revolutions and stopped at 1000 on the scale, whereby the price scale which is connected with said pointer is moved forward a certain predetermined distance, by which the proper figures indicating the value of the load at the price named is brought to view, as stated.

The construction of my machine is further explained by reference to the accompanying drawings, in which—

Figure 1 represents a plan view; Fig. 2 is an end view, part in section, and Fig. 3 is a vertical section, drawn on line $x$—$x$ of Fig. 1.

Like parts are identified by the same reference numerals throughout the several views.

1 is the so-called weight scale, which indicates the weights of the load from ten pounds to two tons.

2 is a pointer which is affixed to and supported from the rotatable shaft 3 above the annular weight scale 1.

4 is a movable flexible scroll upon which the cost scale is printed, which cost scale gives the prices of coal in lots, as stated, from ten pounds to two tons. The scroll 4 is supported at one end from the roller 5 and at its opposite end from the roller 6 and motion is communicated to the scroll from the pointer 2 through the shaft 3, gear 7, pinion 8, shaft 9, worm gear 10, worm wheel 11, shaft 12 and fabric supporting roller 5, whereby as said pointer is revolved over the weight scale, the scroll will be slowly drawn from one of said rollers to the other, and whereby the several columns of figures 13 printed on said scroll are caused to pass beneath the longitudinal slot 14 which is formed in the scroll inclosing case 15.

16 is a stationary column of figures, which figures indicate the price per ton of coal regardless of the quantity, from $3.00 to $11.00 per ton. For example, assuming that the price of coal purchased is $3.00 per ton, as indicated at the left hand of the stationary column 16 in Fig. 1. The pointer is moved over the scale 1 and stopped at the figures corresponding with the weight of the load, when the quantity weighed at $3.00 per ton will, as indicated by the movable column 13, be $1.95, as shown on the movable scroll below the cost price. Again, if the price per ton were $6.00, the cost of the load would be $3.90, as indicated in the column 13 of the movable scroll below the cost price.

A spiral spring 16' is connected at one end with the roller supporting shaft 17 and at its opposite end with the case 15 by the pin 18, whereby as the scroll 4 is drawn from the roller 6 to the roller 5, said spring will be wound up by the action of the moving scroll, as said pointer 2 is revolved. When, however, the roller 5 is moved in the opposite direction, the roller 6 will be revolved in the opposite direction by the recoil of said spiral spring, whereby the scroll is retained tight when moving in either direction. The roller 5 is revolubly supported upon the shaft 12 and said shaft is supported at its respective ends in suitable journal bearings from the end walls of the inclosing case 15, while the roller supporting shaft 17 is in like manner revolubly supported in suitable journal bearings in the end walls of said case. The longitudinal slot 14 is preferably covered with a glass 20, through which the figures of the scroll may be readily seen. My device as thus far described is adapted to be manually operated by turning the pointer 2.

Preparatory to ascertaining the cost price of a load, the pointer 2 is revolved toward the left until the scroll 4, upon which the cost scale is printed, and said pointer are both brought back to the starting or zero point. The value of the load to be computed, is then ascertained by moving the pointer 2 in the opposite direction or to the right a distance corresponding with the weight of the load. For example, as stated, if the weight of the load should weigh one ton and a half, the pointer is given a complete revolution and a half, when it is stopped at the figure 1000, when the movement of the pointer is communicated to the cost scale mechanism as hereinbefore described, and the cost price of the load will be brought to view as previously stated, beneath the price per ton of the stationary scale when the pointer 2 may again be turned back to the zero point for the next succeeding load, when the process of computing the price may be again in like manner repeated.

While my invention as thus far described is operative and practical, for convenience of operation, I connect a spiral spring 21 at one end with the shaft 3 and at its opposite end at a fixed point with the wall 22 of the inclosing case, whereby as the pointer 2 is turned toward the left, or back to the zero point, as previously described; said spiral spring 21 will be wound up or put under tension, so that when the pointer 2 is released, it will be automatically moved forward over the scale by the recoil of said spring. As a convenient means of stopping the pointer 2 at the desired point, I have provided an additional pointer 23, which pointer 23 is revolubly supported from the shaft 3 above the rigidly affixed pointer 2 and said pointer 23 is provided with a lever 24, which is pivotally supported therefrom upon the pin 25.

26 is a spring which is rigidly affixed at one end to the pointer 23 by a screw 27, or in any other convenient manner and bears at its upper end against the upper end of the lever 24, whereby the opposite end 28 of said lever is thrown downwardly so as to contact with and serve as a stop for the pointer 2. The object of the lever 23 is to stop the pointer 2 at the proper place on the weight scale to indicate the weight of the load.

29 is an annular ratchet which is secured to the face plate of the dial 30 and 31 is a vertically moving pawl which is yieldingly retained in contact with the teeth of the ratchet 29 by the spiral spring 31′, said spring 31′ being interposed between the collar 32 formed on the lower end of the pawl and the upper wall of the inclosing chamber 33 of said ratchet, whereby said pawl is adapted to engage the teeth of said ratchet and thereby hold the pointer 23 at any desired point of adjustment over the scale. Thus, for example, if it is desirable to stop the pointer 2 at the figures 50 to indicate the fractional weight of a ton at such point, the pawl 31 is caused to engage in the teeth of the ratchet at such point. By way of explanation, we will assume that the spring 21 is first wound up and that the weight of the load is one ton and 500 pounds. The pointer 23 is adjusted by the pawl and ratchet device at the 500 pound mark on the weight scale. When this is done, the pointer 2 is released by pressing downwardly upon the upper arm of the lever 24, while the lower arm 28 of the lever is disengaged from the pointer 2 and said pointer 2 is permitted to make one complete revolution, which is the movement required for one ton, when it will be stopped in its second revolution by contact with the arm 28 of the lever, whereby the total cost of the load will be indicated, as previously described, on the movable scroll.

While I have shown and described a spring actuated pawl and ratchet for holding the pointer 23 at the desired point of adjustment, it is obvious that a movable pin and a plurality of apertures, or any other equivalent mechanism, may be substituted for said pawl and ratchet for thus holding the pointer in place. While, by the device thus described, the spring 21 is adapted to be wound up by revolving the pointer 2, as described, with which it is connected, it is obvious that if desired, a separate and independent mechanism may be connected with said spring for winding the same independently of the movement of the pointer or the scroll carrying rollers.

Having thus described my invention, what I claim as new, and desire to secure by Letters Patent, is—

1. In a computing machine of the class described, the combination of an annular weight scale, a revoluble shaft centrally supported within said weight scale, a pointer rigidly affixed to the upper end of said shaft and adapted to be moved over said scale, a gear wheel supported from said shaft, a pinion adapted to mesh with said gear wheel, a shaft for supporting said pinion, a worm gear secured to the opposite end of said shaft from said pinion, a worm wheel meshing with said worm gear, a shaft supporting said worm gear, a roller supported on said shaft, means for supporting said shaft from its inclosing case, a second shaft arranged parallel to said first named shaft, means for supporting said second shaft at its respective ends from the walls of said inclosing case, a roller mounted upon said second shaft, a scroll supported at its respective ends upon said rollers and adapted to be alternately wound from one of said rollers to the other as said rollers are revolved, index numerals printed on said scroll adapted to indicate the price or value of the goods computed, a stationary price per ton scale located in close proximity to said scroll, a spiral spring for revolving said second roller as the scroll on the first named roller is released, a longitudinal aperture formed in said scroll inclosing case in close proximity to said scroll, said scroll being adapted, as said pointer is moved over the annular weight scale to be wound from said first named roller to said second named roller beneath said longitudinal aperture, the relative adjustment of said coöperating parts being such that as the pointer is moved to the index characters of the weight scale, the characters on said scroll which indicate the value of the load will be brought to view beneath said longitudinal aperture, whereby the cost of any given quantity of goods per ton will be indicated by the numerals which are brought to view beneath said longitudinal aperture, substantially as and for the purpose specified.

2. In a computing machine of the class described, the combination of an annular weight scale, a revoluble, rigidly affixed pointer adapted to be moved over said scale, a stationary price per ton scale, a movable cost scale, means for communicating motion from said pointer to said movable cost scale, a second pointer revolubly supported upon said shaft above said first named pointer, an annular ratchet supported from the base of said annular weight scale, a pawl connected with said second pointer and adapted to engage the teeth of said ratchet and retain said pointer at any desired point of adjustment, a spiral spring connected at one end to said shaft and at its opposite end at a fixed point with its inclosing case, a spring actuated lever pivotally connected with said second named pointer and adapted to serve as a stop for said first named pointer as the latter is revolved by the recoil of said spiral spring, said first named pointer being adapted to be manually moved and adjusted at a point on said weight scale corresponding with the weight of the load, while said first named lever is adapted to be moved by the recoil of said spiral spring with said second lever and to pass beneath it when released from contact with said stop, all substantially as and for the purpose specified.

In testimony whereof I affix my signature in the presence of two witnesses.

ALBERT Z. SEE.

Witnesses:
 IRA W. PARKER,
 RALPH CLARK.